April 4, 1967 — P. G. KAPPUS — 3,312,424
VTOL AIRCRAFT
Original Filed Sept. 6, 1957
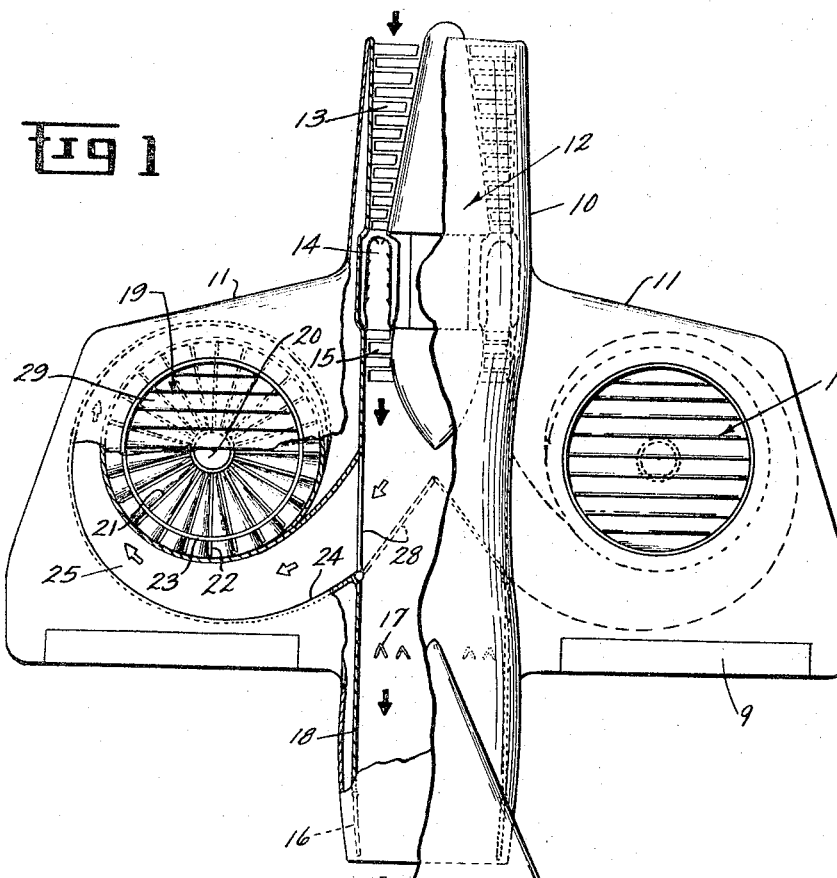
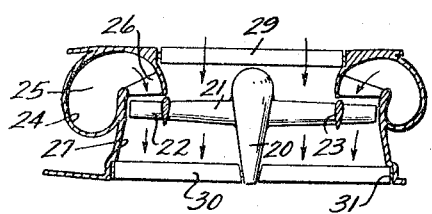
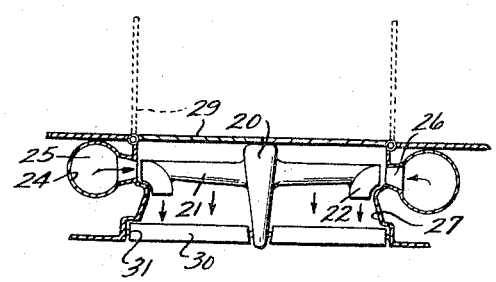
INVENTOR.
PETER G. KAPPUS
BY John F. Cullen
ATTORNEY

United States Patent Office 3,312,424
Patented Apr. 4, 1967

3,312,424
VTOL AIRCRAFT
Peter G. Kappus, Cincinnati, Ohio, assignor to General Electric Company, a corporation of New York
Original application Sept. 6, 1957, Ser. No. 682,327, now Patent No. 3,176,934, dated Apr. 6, 1965. Divided and this application Feb. 18, 1964, Ser. No. 345,713
The portion of the term of the patent subsequent to Apr. 6, 1982, has been disclaimed
1 Claim. (Cl. 244—12)

This application is a division of my copending application Ser. No. 682,327, filed Sept. 6, 1957, now Patent No. 3,176,934.

The present invention relates to a VTOL aircraft and more particularly to the combination of a novel propulsion system with such aircraft which is capable of propelling the aircraft in normal fashion at supersonic speed and is also capable of providing vertical lift to permit vertical take-off.

The VTOL or vertical take-off and landing aircraft, as such, is not new. Many types have been proposed over the years and a few have been successful. More recently, with the advent of the jet engine, VTOL aircraft employing jet engines have been studied and produced. In conventional normal flight, a jet plane requires rather long runways for take-off and landing maneuvers. Some proposals have disclosed aircraft in which the jet engines are rotatable within the wings so that they may exhaust directly downwardly for vertical lift and then be rotated into a horizontal position for normal flight. Generally speaking, to applicant's knowledge, these kinds of aircraft have not been very successful due to the very high fuel consumption in hovering flight. Other proposals have offered the so called "flying bedstead" or coleopter type VTOL aircraft which offers promise for certain missions. However, the main drawback appears to have been in the conception of a practical aircraft which is suitable for both vertical take-off and high subsonic and preferably supersonic horizontal speeds. While achieving these desired characteristics in an aircraft, a system is required that is both feasible and economical within the limits of the mission to be accomplished by the aircraft. At the same time, such a system must be relatively simple and straightforward because of weight problems. One proposal, that is well known, employs a jet engine which drives an auxiliary air compressor by means of gear reduction mechanism to supply air to turbofans lying within the wings. A number of energy conversions are thus required and, of course, with every energy conversion there is a loss present. However, this type of VTOL aircraft appears promising and, it is this type that the instant invention improves upon.

The main object of the present invention is to provide a VTOL aircraft that requires the minimum of equipment and consequently light weight design that is capable of satisfactory and economical vertical take-off and high subsonic or supersonic operation.

A further object of the invention is to provide such an aircraft that minimizes the number of energy conversions that are required for both horizontal and vertical flight.

A further object is to provide such an aircraft that converts directly the small high energy mass flow of the primary engine into a large low energy mass flow in the wing engines with a consequent reduction in the amount of fuel consumed during hovering flight.

Still a further object of the invention is to disclose such an aircraft which permits very high thrust to be obtained in hovering flight at a moderate specific fuel consumption and permits the considerably lower thrust required for horizontal flight at a higher specific fuel consumption than is required in the normal use of one and the same power generator for both horizontal flight and hovering flight.

Briefly stated, in accordance with my invention, I provide a VTOL aircraft which, in high speed flight, is propelled by a conventional tuboject type engine or suitable gas generator, with or without reheat, and controlled in the conventional manner. For hovering flight and for vertical take-off and landing, the high pressure gas produced by the turbojet engine is diverted, instead of entering the tailpipe, into turbofan units located inside the wing sructure on both side of the fuselage. No intermediate energy conversions are required. The high pressure gas is utilized in these wing units to drive high mass flow preferably single stage ducted fans for vertical or substantially vertical lift. Thus the small high energy mass flow of the primary engine is converted into a large low energy mass flow in the wing units.

My invention will be better understood from the following description taken in connection with the accompanying drawing and its scope will be pointed out in the appended claims.

In the drawing:

FIGURE 1 is a partial cross sectional plan view of an aircraft utilizing the novel powerplant of the instant invention.

FIGURE 2 is a partial cross sectional view of an axial flow wing unit and,

FIGURE 3 is a view similar to FIGURE 2 showing a radial flow type wing unit.

Referring first to FIGURE 1, there is shown a plan view of the VTOL aircraft of the instant invention which includes a conventional fuselage 10 having a pair of wings 11 extending therefrom which wings may be of any suitable form including the swept-back type shown for high supersonic forward flight. Control surfaces or flaps 9 are mounted on the trailing edges of wings 11 and are conventional flight control means for aircraft. For normal forward flight fuselage 10 has supported therein a gas generator generally indicated at 12 which may conveniently be in the form of an axial flow turbojet engine although not being limited to a particular gas generator. As such, the engine has a compressor section 13, a combustion section 14, and a turbine section 15. For propelling the aircraft in horizontal flight, a nozzle 16 is provided at the aft end of the fuselage. Nozzle 16 may be of any suitable well-known form and will normally be of the variable area type. In order to provide for thrust augmentation or reheat operation, additional fuel injection means 17 may be provided in the tailpipe 18. The powerplant thus far described is any conventional powerplant of the jet engine type for normal forward or horizontal flight.

To provide for vertical take-off or direct lift for take-off from the ground where no substantial forward speed is available for take-off, I provide large low energy mass flow units such as turbofans generally indicated at 19 which are mounted in the plane of the wings 11 for rotation about an axis substantially perpendicular to the plane of the wing. Obviously one or more turbofans may be employed in each wing as required. The function of the turbofans is to induce a large mass of ambient airflow through the wings from the top surface to the bottom to provide vertical lift as will be apparent from the drawing. To this end, as may be seen in FIGURE 2 the turbofan unit includes a large fan 20 having fan blades 21 thereon and being suitably supported in the wing by means not shown for rotation therein. The fan is turned or driven by means of a concentric turbine consisting of turbine buckets 22 mounted on the periphery of the fan blades. Suitable shroud means 23 separate the blades and buckets. As shown, the turbofan unit is common in that the fan blades and turbine buckets are mounted on the same wheel. Obviously, they could be mounted on separate wheels and achieve the same result. In addition, it is to be noted that while I have illustrated the turbine buckets as being mounted on the outer periphery of the fan blades as a preferable execution of the invention, they could also be mounted inwardly of the fan blades and these suggested modified constructions will be apparent from the showings of FIGURES 2 and 3. The gas for driving the turbofans is obtained directly from the main engine 12 by suitable conduits 24 which connect the interior of the fuselage with the wing turbines, this connection being downstream of the main engine to intercept the engine's exhaust gas. Conduits 24 direct the exhaust gas into a manifold or scroll 25 which direct it into turbine nozzle 26 where the gas is passed to the turbine buckets to drive the fan in wing conduits 27. An axial type turbine is shown in FIGURE 2 and a radial type turbine is shown in FIGURE 3. Either type unit may be successfully employed.

For normal forward flight the wing units are inoperative and the main engine exhaust is directed through nozzle 16. Horizontal flight is provided for by means such as valve means 28 which may be pivotally attached to the fuselage for closing off conduits 24 and permitting exhaust gases to flow directly to the propulsion nozzle 16. In addition, when the conduits 24 are blocked, the turbofan wing units are also blocked to present a smooth wing surface by means of a gate 29 which may take the form as shown in FIGURE 3 and are pivoted to close over the opening of conduit 27 or, may be in the form of louvers as shown in FIGURE 2 which are rotated to closed position.

In vertical take-off when the thrust is downwardly, it is desired to have some means of control as to upward direction so that the thrust may be directly downward or at an angle to the ground. This is obtained by the use of control vanes 30 mounted on the lower wing surface and movable to provide direction to the fan discharge. These vanes may be conveniently in the form of flaps which are pivoted to the wing surface at 31 to permit rotation to any desired angle.

The operation of the aircraft will be apparent from the above description. In normal forward flight the gas generator or turbojet engine 12 provides propulsive thrust by its exhaust gases through nozzle 16. At this time valve means 28 are placed in a position preventing entry of discharged gas into the conduit 24 and presenting a smooth inner surface for the direct passage of the exhaust gas to the nozzle. At the same time, control vanes 30 and gate 29 are closed to provide a smooth wing surface.

For vertical take-off, valve means 28 may be selectively rotated to divert the exhaust gas downstream of the engine, with no intermediate conversion, into conduit 24 driving the tip turbines and the wing fans. At the same time gates 29 will be opened and control vanes 30 will be suitably oriented to give the desired angle of vertical lift. A large low energy mass flow of ambient air is thus induced by fans 20 which are driven directly by the small high energy mass flow of the main engine to provide vertical lift.

Thus the present invention avoids energy losses in converting from one form of energy to another and utilizes the main engine exhaust directly by the wing turbofans for vertical lift and, selectively, by the propulsion nozzle for forward flight which permits high subsonic and supersonic forward flight.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim as new and desire to secure by Letters Patent of the United States is:

An aircraft which comprises, in combination, a supporting wing provided with a duct extending throughout it and substantially at right angles thereto, a lift producing rotor journalled in said wing coaxially with said duct and on the inside thereof, a gas operated motor operatively connected with said rotor for driving it, a reaction nozzle carried by said aircraft and extending in the fore-and-aft direction thereof, means carried by said aircraft by producing power gas, means for connecting the output of said power gas producing means either with said motor for driving said rotor or with said nozzle for jet propulsion from said nozzle, and a control flap mounted on the trailing edge of said wing, and a tail unit extending behind the rear edge of the wing and having elevator means thereon.

References Cited by the Examiner

UNITED STATES PATENTS 3,080,137   3/1963   Hurel et al. _____ 244—12

FOREIGN PATENTS 1,068,404   2/1954   France.

MILTON BUCHLER, *Primary Examiner.*

RALPH D. BLAKESLEE, FERGUS S. MIDDLETON,
*Examiners.*

G. P. EDGELL, L. C. HALL, A. E. CORRIGAN,
*Assistant Examiners.*